United States Patent [19]

Danboise

[11] Patent Number: 4,953,904
[45] Date of Patent: Sep. 4, 1990

[54] MATTRESS CARRIER

[76] Inventor: William S. Danboise, 4119 E. Beryl, Phoenix, Ariz. 85028

[21] Appl. No.: 308,302

[22] Filed: Feb. 9, 1989

[51] Int. Cl.$^5$ .............................................. B65G 7/12
[52] U.S. Cl. ........................................ 294/15; 294/26
[58] Field of Search .................. 294/15, 16, 19.1, 26, 294/131, 137, 149, 151, 153, 154, 157, 168, 169, 170

[56] References Cited

U.S. PATENT DOCUMENTS

| D. 255,317 | 6/1980 | Slinkard | 294/15 X |
|---|---|---|---|
| 151,295 | 5/1874 | Knight | 294/26 |
| 338,885 | 3/1886 | Stockinger | 294/26 |
| 488,357 | 12/1892 | Hill | 294/26 |
| 1,625,152 | 4/1927 | Pine | 294/131 |
| 2,399,786 | 5/1946 | Caton | 294/151 X |
| 2,428,941 | 10/1947 | Packard | 294/15 X |
| 2,930,583 | 3/1960 | Noe et al. | 294/15 X |
| 4,190,278 | 2/1980 | Jancik | 294/137 X |
| 4,431,226 | 2/1984 | Weilert | 294/153 X |
| 4,695,085 | 9/1987 | Cassels | 294/26 X |

FOREIGN PATENT DOCUMENTS

| 239729 | 7/1962 | Australia | 294/26 |
| 582616 | 8/1933 | Fed. Rep. of Germany | 294/170 |

Primary Examiner—Johnny D. Cherry
Attorney, Agent, or Firm—Harry M. Weiss

[57] ABSTRACT

A mattress carrier, of molded, integrated, high impact plastic construction, has a pair of opposed sides and a bottom that form an open ended cradle.

5 Claims, 1 Drawing Sheet

U.S. Patent     Sep. 4, 1990     4,953,904
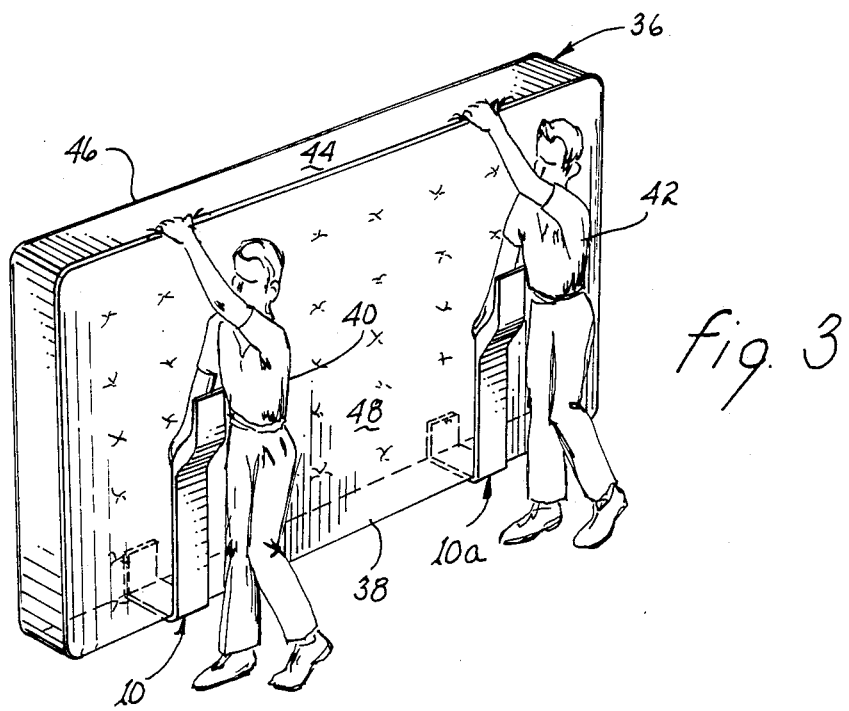
fig. 3
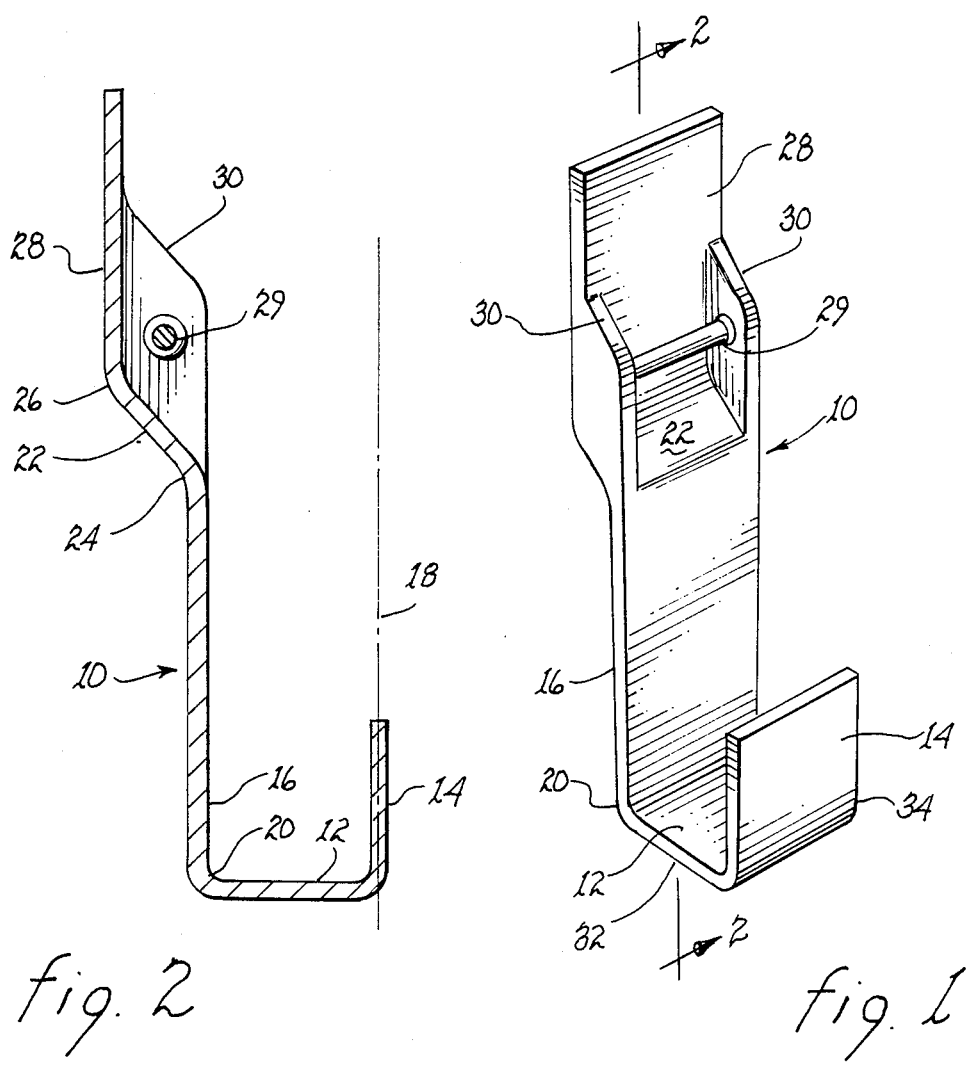
fig. 2
fig. 1

MATTRESS CARRIER

BACKGROUND OF THE INVENTION

1. Field of Invention

This invention relates to hand held carriers and methods therefor and, more particularly, to a hand held carrier for a mattress of a bed and method therefor.

2. Description of the Prior Art

During the moving of furniture, a recurring problem is moving a mattress of a bed. Two people may, for example, have to drag the mattress if it is king sized. The dragging may be across a dirty floor or a sidewalk. Since the mattress is bendable, it can envelope a substantial portion of the torso of one or both of the people, possibly obscuring vision and thereby causing a fall which can result in an injury.

Typically, the sides of the mattress include fiber covered flexible handles, usually four in number. To carry the mattress through a hallway, for example, the mattress is grasped by the handles and moved with its sides perpendicular to the walls of the hallway. In other words, a lower side is close to the floor and an upper side is close to the ceiling. Accordingly, when the handles are grasped, a person's one arm extends to a handle on the lower side and the other arm extends to a handle on the upper side. Therefore, the handles are not easily used.

For reasons given hereinbefore, there is a need for a mattress carrier and method which is easy and safe to use and economical to construct.

SUMMARY OF THE INVENTION

An object of the present invention is to provide an apparatus and method for easily transporting large objects such as a mattress of a bed.

According to the present invention, two opposed sides and a bottom of a mattress carrier form an open ended cradle. One of the sides includes a handle.

Other objects, features and advantages of the present invention will be more fully understood from the following description and drawing.

BRIEF DESCRIPTION OF THE DRAWING

FIG. 1 is a perspective view of the preferred embodiment of a mattress carrier of the present invention where the location of the handle of the mattress carrier is shown;

FIG. 2 is a view of the embodiment of FIG. 1 taken along the line 2—2; and

FIG. 3 is a perspective view of the mattress carrier of the present invention where the carrying of a mattress is shown.

DESCRIPTION OF THE PREFERRED EMBODIMENT

Referring to FIGS. 1 and 2, a mattress carrier 10 of preferably molded, integrated, high impact plastic construction, has a bottom 12 that extends between opposed sides 14, 16 to form an open ended cradle. Between side 14 and a proximal portion 20 of side 16, there is a separation that is substantially equal to or slightly larger than the thickness of a mattress of a bed.

A curved portion 22 of side 16 is formed by an arcuate bend 24 in one direction and a substantially equal arcuate bend 26 in an opposite direction. Arcuate bend 26 is contiguous with a distal portion 28 of side 16. Because of arcuate bends 24,26, distal portion 28 has a greater distance from the plane of a surface of side 14 than the distance between proximal portion 20 and the plane of side 14.

Portions 22, 28 have integral therewith opposed end plates 30 that carry a preferably generally cylindrical shaped handle 29. The axis of handle 29 is parallel to the plane of a surface of side 14 and to bottom 12. The distance between bottom 12 and handle 29 is on the order of two feet. Preferably, the distance between the axis of handle 29 and the plane 18 of side 14 is greater than the distance between proximal portion 20 and the plane 18 of side 14. Therefore, a person using carrier 10 may easily place a hand around handle 29 when a mattress is cradled within carrier 10.

In this embodiment, the distance between end plates 30 substantially equals the distance between open ends 32, 34 of carrier 10. In an alternative embodiment, the distance between end plates 30 may be different from the distance between ends 32, 34.

Referring to FIG. 3, a mattress 36 is cradled on a (bottom) side 38 by carrier 10 and a carrier 10A. Carrier 10A is similar to carrier 10. A first person 40 grasps handle 29 while a second person 42 grasps the handle of carrier 10A. Persons 40, 42 lift mattress 36 together via carriers 10, 10A, respectively.

Persons 40, 42 may grasp a (top) side 44 of mattress 36 to support mattress 36. Because handle 29 is on the order of two feet from bottom 12, and a corresponding handle of carrier 10A is on the order of two feet from the bottom thereof, the arms of persons 40, 42 do not have to extend from (bottom) side 38 to (top) side 44; the arms extend about two feet less thereby placing less strain on the arms and bodies of persons 40,42. Additionally, sides 14, 16 and corresponding sides of carrier 10A support mattress 36 by abutting against a (top) surface 46 and a (bottom) surface 48 thereof, respectively. Accordingly, carrier 10 is in contact with three portions of mattress 36, namely (bottom) side 38, (top) surface 46 and (bottom) surface 48 thereby providing retention of mattress 36.

While the invention has been particularly shown and described with reference to a preferred embodiment thereof, it will be understood by those skilled in the art that changes in form and detail may be made therein without departing from the spirit and the scope of the invention.

I claim:

1. A mattress carrier comprising:
   a unitary member, said member including
   a first plate-like side opposed to a second plate-like side;
   a plate-like bottom, said first and second sides and said bottom forming an open ended cradle where said bottom is connected to a proximal portion of each of said first and second sides, the interior distance between said first and second sides being at least equal to the thickness of a mattress to be carried, said first side having an outwardly curving portion between said proximal portion of said first side and a distal portion of said first side;
   a pair of opposed end plates extending upwardly from said curving portion and perpendicularly to said first side; and
   a handle connected to said end plates and positioned outwardly of the plane of said first side.

2. The mattress carrier of claim 1 wherein said handle is of generally cylindrical shape with an axis parallel to said second side.

3. The mattress carrier of claim 1 wherein said curving portion is formed by two substantially equal arcuate bends in opposite directions.

4. The mattress carrier of claim 1 wherein said sides, end plates and handle are of an integrated, molded construction.

5. The mattress carrier of claim 4 wherein said construction is from a high impact plastic.

* * * * *